United States Patent [19]

Blomberg

[11] 3,786,653
[45] Jan. 22, 1974

[54] ABSORPTION REFRIGERATION SYSTEM OF THE INERT GAS TYPE

[75] Inventor: Peter Erik Blomberg, Stockholm, Sweden

[73] Assignee: Aktiebolaget Electrolux, Stockholm, Sweden

[22] Filed: Mar. 9, 1971

[21] Appl. No.: 122,413

[30] Foreign Application Priority Data
Mar. 10, 1970  Sweden.............................. 3152/70

[52] U.S. Cl....................... 62/491, 62/492, 62/494, 62/527, 165/179
[51] Int. Cl............................................. F25b 15/10
[58] Field of Search..... 62/490, 491, 492, 494, 527; 165/179; 137/561 A

[56] References Cited
UNITED STATES PATENTS 2,691,281 10/1954 Phillips ................................ 62/494
2,300,579 11/1942 Lenning ................................ 62/491
2,307,947 1/1943 Payne ................................... 62/491
2,408,480 10/1946 Reid, Jr. ............................... 62/494 X
2,426,044 8/1947 O'Brien ................................ 62/494 X
2,804,757 9/1957 Ullstrand et al. .................... 62/494 X
3,078,690 2/1963 Phillips et al. ....................... 62/494 X Primary Examiner—William F. O'Dea
Assistant Examiner—Peter D. Ferguson
Attorney, Agent, or Firm—Edmund A. Fenander

[57] ABSTRACT

Liquid flows in the presence of an inert gas in heat transfer members, such as the evaporator and absorber, of an inert gas circuit of absorption refrigeration apparatus. The heat transfer members are formed by piping which slopes downward and is inclined at an acute angle to the horizontal and has a plurality of internal longitudinal capillary grooves. The grooves are helical and at an acute angle to the generatrix or slope of the piping which is less than the acute angle at which the piping is inclined to the horizontal.

10 Claims, 6 Drawing Figures

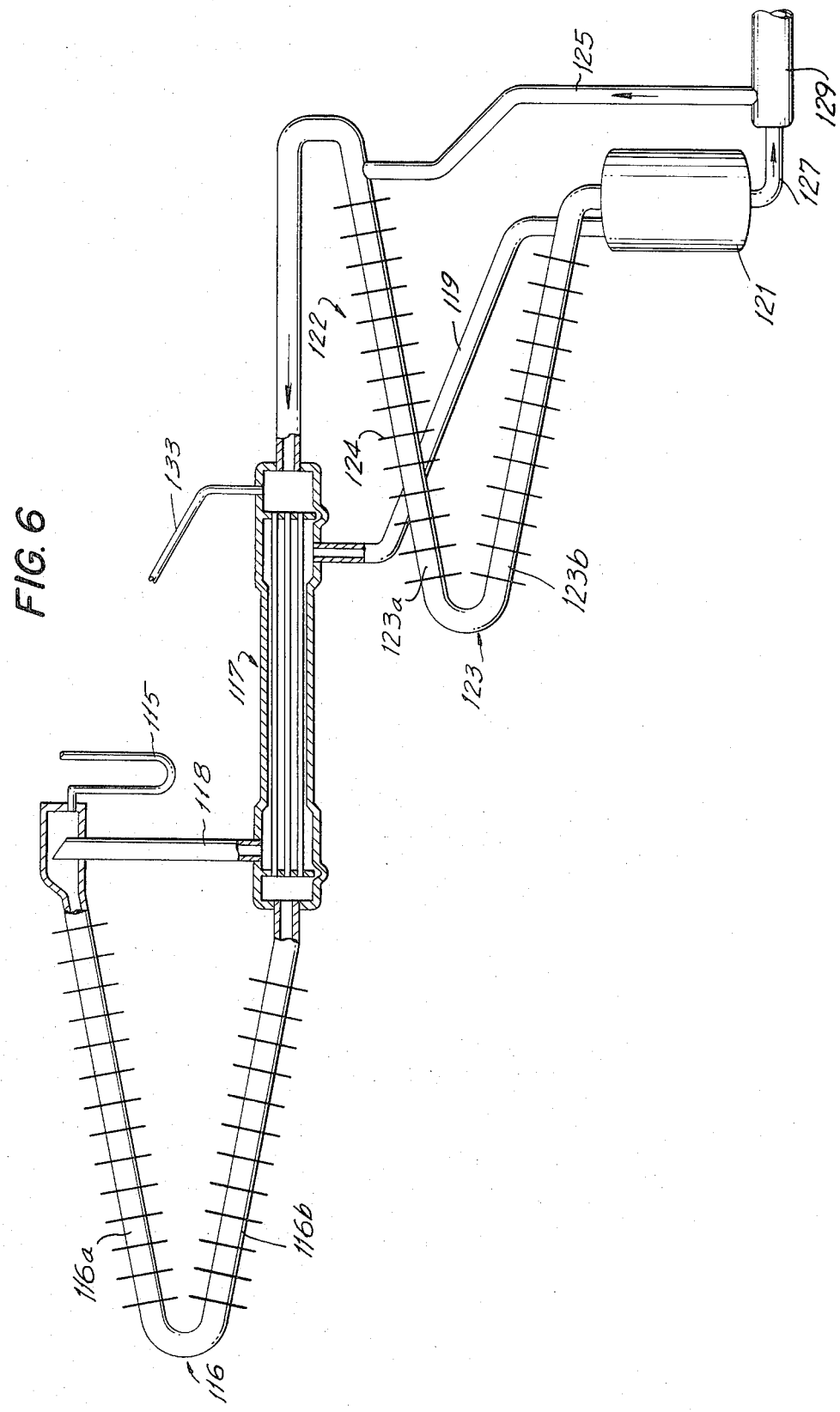

3,786,653

ABSORPTION REFRIGERATION SYSTEM OF THE INERT GAS TYPE

BACKGROUND OF THE INVENTION

1. Field of the Invention

My invention relates to absorption refrigeration apparatus in which the evaporator and absorber function as heat transfer members and form parts of an inert gas circuit in each of which liquid flows in the presence of the gas. In the evaporator liquid refrigerant flows in the presence of inert gas and evaporates and diffuses into the gas with consequent absorption of heat through the evaporator walls from the surroundings of the evaporator. In the absorber absorption liquid flows in the presence of inert gas which has been enriched by refrigerant in the evaporator. The absorption liquid, due to absorption of refrigerant vapor from the gas mixture formed in the evaporator, becomes heated and such heat is conducted through the absorber walls and given up to surrounding cooling air flowing in heat exchange relation with the absorber.

2. Description of the Prior Art

The evaporator and absorber of absorption refrigeration apparatus of the inert gas type are usually formed of piping through which liquid flows downward by gravity in the presence of the gas. In order for these components to function efficiently as heat transfer members the surface contact between the gas and liquid at the wall areas of the members should be at a maximum. This is achieved by effecting flow of liquid in such manner that the liquid will come in contact with as much of the wall area as possible.

In known absorption refrigeration apparatus of this kind the piping has been formed with internal capillary grooves to promote spreading of liquid flowing through the piping. Such internal capillary grooves have been employed that are parallel to the axis of the piping and also normal or perpendicular to the piping axis. Further, internal capillary grooves have been employed which extend longitudinally of the piping and are helical.

Absorber and evaporator piping of the kind just described is expensive because the piping must be made with precision in order to form the internal grooves accurately to insure that capillary flow of liquid will be effected. When helically extending grooves are formed with a very small pitch angle, capillary forces alone must be relied upon to promote spreading of liquid which is objectionable. When parallel grooves extending longitudinally of the piping are employed, additional provisions must be made at the liquid inlet to distribute liquid about the entire inner wall of the piping. When small deformations occur in grooves at the inner wall of the piping spreading of liquid is adversely affected and the contact surface between the gas and liquid will be reduced.

SUMMARY OF THE INVENTION

It is an object of my invention to provide piping for absorbers and evaporators of absorption refrigeration apparatus having internal grooves which extend lengthwise of the piping and define paths of flow for the liquid. The piping is inclined to the horizontal and the longitudinal grooves in turn are at an angle to the generatrix or slope of the piping and function as means for guiding liquid in the aforementioned paths of flow. With this construction successive regions of the grooves in the direction of liquid flow are located at progressively different vertical distances from a horizontal plane intersecting the grooves.

When the internal longitudinal grooves all slope downward in the direction of liquid flow in the piping from the zone at which liquid is introduced, the angle of the grooves to the slope of the piping is such that successive regions of the grooves in the direction of liquid flow will be located at increasingly greater vertical distances from a horizontal plane passing through the grooves at the zone at which they commence to slope downward. In this way flow of liquid in the grooves is promoted primarily by hydrostatic pressure. When the grooves slope downward from the zone at which liquid is introduced into the piping, flow of liquid in the grooves also is aided by the force of gravity.

In order to effect turbulent movement of gas in absorber and evaporator piping, the piping at the top part thereof is formed with indentations which are in spaced relation and so constructed that drops of liquid are formed at their lowest parts and fall therefrom. The piping at the bottom part thereof also is formed with a plurality of indentations which are in spaced relation and located so that drops of liquid from the indentations at the top part of the piping will fall and collect in front of the indentations in the bottom part of the piping. The indentations function to stir gas flowing through the piping, such stirring action being aided and abetted by the rainfall of liquid drops and splashing of such drops in the shallow liquid pools formed in front of the indentations in the bottom part of the piping.

BRIEF DESCRIPTION OF THE DRAWING

In the drawing,

FIG. 6 is a fragmentary view of parts similar to those shown in FIG. 1 in which the conduits for promoting surface contact between a gas and a liquid are illustrated at a greater inclination to the horizontal.

DESCRIPTION OF THE PREFERRED EMBODIMENT

Figure 1:
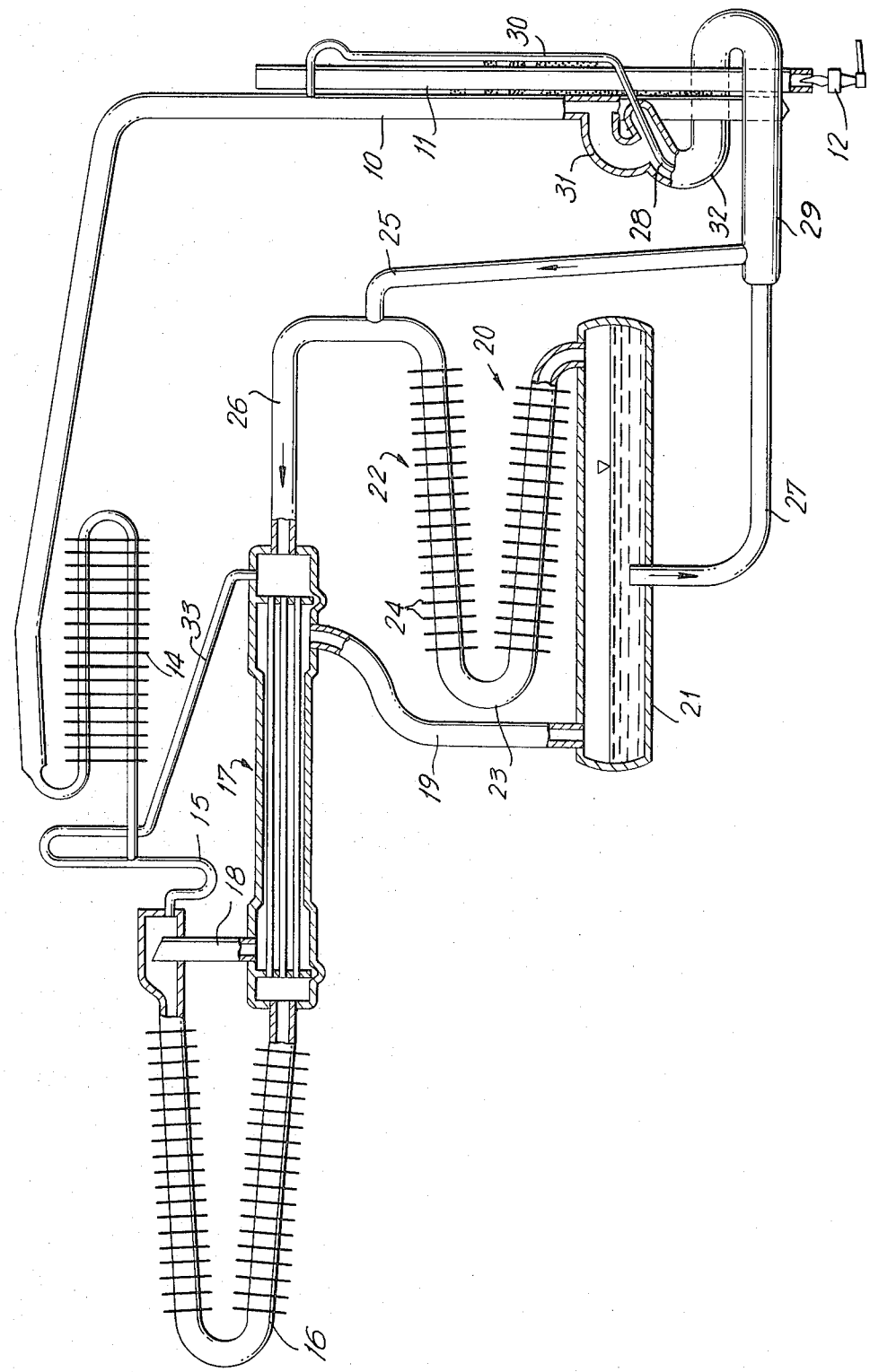
FIG. 1 is a view more or less diagrammatically illustrating an absorption refrigeration system of the inert gas type having conduits embodying my invention for promoting surface contact between a gas and a liquid.

Referring to the drawing, I have shown my invention in connection with an absorption refrigeration system of a uniform pressure type which is well known in the art and in which an inert pressure equalizing gas is employed. Such a refrigeration system comprises a generator or boiler 10 containing a refrigeration, such as ammonia, in solution in a body of absorption liquid, such as water. Heat may be supplied to the boiler 10 from a heating tube or flue 11 thermally connected therewith, as by welding. The heating tube 11 may be heated in any suitable manner, as by an electrical heating element positioned therein or by a liquid or gaseous fuel burner 12, for example, which is adapted to project its flame into the lower end of the tube.

The heat supplied to the boiler 10 and its contents expels refrigerant vapor out of solution, and the vapor thus generated flows to an air cooled condenser 14 in which it is condensed and liquefied. Liquid refrigerant flows from condenser 14 through a conduit 15 into a cooling element 16 in which it evaporates and diffuses into an inert pressure equalizing gas, such as hydrogen, which enters the lower part thereof from a gas heat exchanger 17. Due to evaporation of refrigerant fluid into inert gas, a refrigerating effect is produced with consequent absorption of heat from the surroundings.

The rich gas mixture of refrigerant vapor and inert gas formed in cooling element 16 flows from the upper part thereof through a conduit 18, gas heat exchanger 17, conduit 19 and absorber 20 comprising a vessel 21 and a coil 22 formed of piping 23 which is provided with a plurality of heat dissipating elements or fins 24. In the absorber coil 22 the rich gas mixture flows countercurrent to downwardly flowing absorption liquid which enters through a conduit 25. The absorption liquid absorbs refrigerant vapor from inert gas, and inert gas weak in refrigerant flows from the upper part of the absorber coil in a path of flow including a conduit 26 and the gas heat exchanger 17 into the lower part of cooling element 16.

Absorption solution flows downwardly through coil 22 into the absorber vessel 21 and such solution, which is enriched in refrigerant, passes from the vessel through a conduit 27 and an inner passage or pipe 28 of liquid heat exchanger 29 which is in thermal exchange relation with the heating tube 11, as by welding. Liquid is raised by vapor-liquid lift action through pipe 30 into the upper part of boiler 10. Refrigerant vapor expelled out of solution in boiler 10, together with refrigerant vapor entering through pipe 30, flows upwardly from the boiler to the condenser 14, as previously explained. The absorption liquid from which refrigerant vapor has been expelled flows from the boiler 10 through a connection 31, an outer pipe or passage 32 of the liquid heat exchanger 29 and conduit 25 into the upper part of the absorber coil 22. The circulation of absorption solution in the liquid circuit just described is effected by raising of liquid through pipe 30.

The outlet end of the condenser 14 is connected by an upper extension of conduit 15 and a conduit 33 to a part of the gas circuit, as to the gas heat exchanger 17, for example, so that any inert gas which may pass through a condenser 14 can flow into the gas circuit. The circulation of gas in the gas circuit is due to the difference in specific weight of the columns of gas rich and weak, respectively, in refrigerant vapor. Since the column of gas rich in refrigerant vapor and flowing from cooling element 16 to the absorber coil 22 is heavier than the gas weak in refrigerant and flowing from the absorber coil to cooling element 16, a force is produced or developed within the system for causing circulation of inert gas in the manner described.

Figure 2:
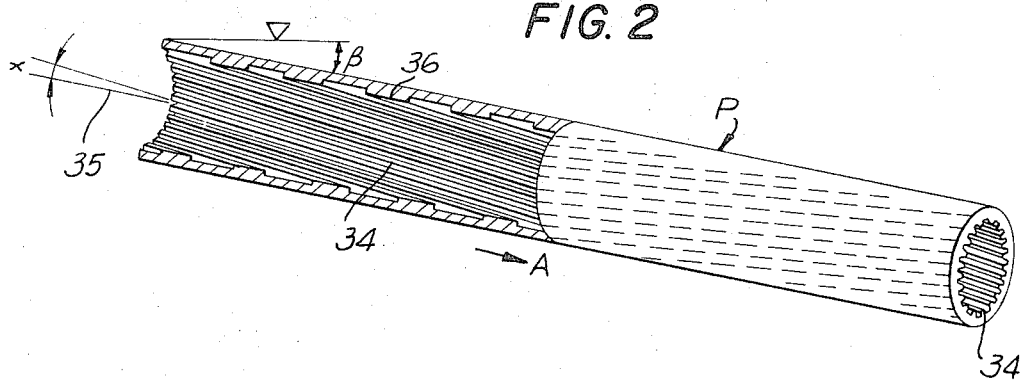
FIG. 2 is a fragmentary view of a conduit, partly broken away and in section, illustrating one embodiment of my gas and liquid contact construction incorporated in FIG. 1.

In FIG. 2 I have shown piping P embodying my invention which is employed as the piping in the cooling element or evaporator 16 and the absorber 23. The piping P is formed with internal longitudinally extending grooves 34 which are essentially square-shaped in section and at a definite acute angle $\alpha$ (Alpha) to the generatrix 35 of the piping. As seen in FIG. 2, the generatrix also defines the slope of the piping P which is at a definite angle $\beta$ (Beta) to the horizontal. I have discovered, in order that liquid will spread over the entire inner surface of the piping P, that the angles $\alpha$ and $\beta$ are critical and should be related in a definite manner with respect to one another.

In absorption refrigeration apparatus constructed in accordance with my invention I have discovered that complete wetting of the inner wall of the piping P is achieved when the angle $\alpha$ is about 6° and the angle $\beta$ is 10°. With the grooves 34 at an acute angle of 6° to the generatrix 35 of the piping and the piping inclined at an acute angle of about 10° to the horizontal, liquid effectively flows in the grooves 34 to the top part of the piping P. Further, when the liquid reaches the top part or ceiling of the piping, part of the liquid flows over the ridges 36 between the grooves and flows downward along the inner wall surface of the piping, so that the liquid will spread over a maximum surface area within the piping.

When the capillary grooves 34 are relatively narrow and have a width less than about 0.8 mm., and the bottom of each groove is formed with a sharp radius, the grooved surface effectively functions to raise liquid by capillary action at one side of the piping and such raised liquid will flow to the opposite side thereof to promote complete wetting of the piping by the liquid distributed by the grooves. In the part of FIG. 2 which is partly broken away, it will be seen that the grooves 34 at the rear of the piping are inclined downward in the direction of liquid flow indicated by the arrow A. Hence, liquid will flow by gravity in such grooves at the rear of the piping P after reaching the top part of the piping by capillary action in the manner just explained.

As seen in FIG. 1, the piping forming the evaporator 16 and absorper coil 23 includes straight sections and connecting bends, the straight sections being disposed one another in the same vertical plane. Alternatively, the absorber coil may be of helical form with the individual turns of the coil disposed directly one above another or laterally displaced with respect to one another. Irrespective of the particular form of the evaporator and absorber coils, these coils can now be made shorter than heretofore due to the effectiveness of gas and liquid contact in my improved piping P. This in turn has made it possible to effect a reduction in the size and weight of the refrigeration apparatus. In the absorber 22 in FIG. 1, for example, the absorber function per unit length of piping has been improved with piping P like that shown in FIG. 2 and just described to such an extent that the overall length of the absorber coil 23 can be materially decreased so that, without any change in the refrigerating capacity of a particular absorption refrigeration system, an absorber 22 having a coil 23 with a single straight section can be employed.

Figure 3:
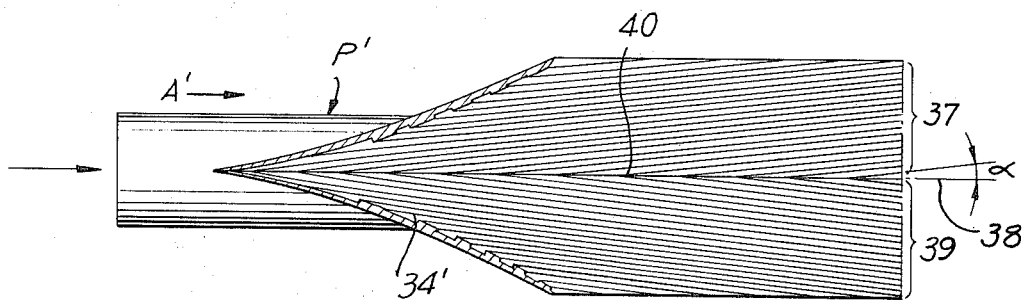
FIG. 3 is a fragmentary view of a conduit illustrating another embodiment of the invention in which a part thereof is broken away and shown in plan view.

In FIG. 3 I have shown another embodiment of the invention in which piping P' is formed with internal capillary grooves 34' having a herringbone arrangement, as seen in the right-hand part of the figure which is in plan view. In this arrangement one-half 37 of the herringbone above the center line 38 is the mirror image of the other half 39 of the herringbone below the center line 38. In this modification the angle $\alpha$ of each groove 34' is about 6° to the center line 38, which corresponds to the slope or generatrix of the piping P', and the angle β at which the piping P' is inclined to the horizontal is about 10°.

The grooves 34' above and below the center line 38 converge toward one another and come together at apices or vertices 40 on the center line 38. The vertices 40 are pointed toward the left in FIG. 3 in a direction which is opposite to the direction liquid flows in the piping P', which is represented by the arrow A'. In this modification liquid flows in the grooves 34' along opposite sides of the piping P' responsive to hydrostatic pressure. Accordingly, the flow of liquid about the top part of the piping P' and down at the opposite side thereof will be less dependent upon capillary action. The piping P', in order to provide the most effective gas and liquid contact, should be incorporated in refrigeration apparatus with the center line 38 at the bottom of the piping.

In both the embodiments of FIGS. 2 and 3 the difference between the angle α and the angle β, which are critical, as pointed out above, should not be less than 2° and not greater than 5°. When this difference is too small the liquid will spread too slowly over the inner wall surface of the piping, and when this difference is too large, the inclination of the piping to the horizontal must be increased to effect continuous flow of liquid.

Refrigeration apparatus in which piping embodying the invention is incorporated will operate most reliably and with highest efficiency when the difference between the angle α and the angle β is between 3° and 4.5°. The exact difference between the angle α and β in any particular instance will depend upon the conditions encountered during operation of the refrigeration apparatus. When the refrigeration apparatus is stationary during operation, the angular difference between the angles α and β can be small. On the other hand, when the refrigeration apparatus during operation is movable, as on a boat or a recreational vehicle like a trailer or camper, for example, the angular difference between the angles α and β should be greater.

Figure 4:
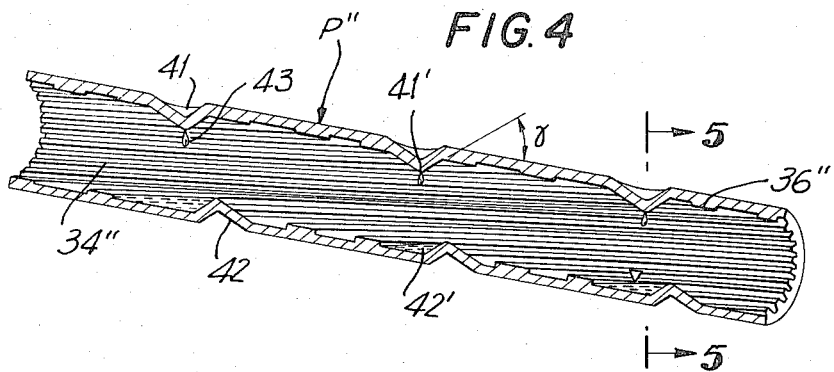
FIG. 4 is a fragmentary longitudinal sectional view of a conduit illustrating still another embodiment of the invention.
Figure 5:
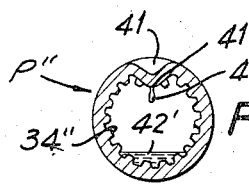
FIG. 5 is a sectional view taken at line 5—5 of FIG. 4.

The piping P'' in the modification of FIGS. 4 and 5 is like the piping P in FIG. 2 and includes indentations 41 and 42 at the top and bottom parts, respectively, of the piping. The indentations 41 are in spaced relation and are so constructed and formed that liquid tends to adhere and flow along the undersides thereof. The indentations 41 are formed with drip noses 41' at their lowest regions at which drops of liquid 43 form and from which the liquid drops will fall.

The drip noses 41' should have an angle γ (Gamma) with the slope of the piping P'' which is of such magnitude that the drops of liquid will be released from the top part of the piping and not continue to flow past the drip noses.

The indentations 42 at the bottom part of the piping P'' also are in spaced relation and located so that the drops of liquid 43 will fall and collect in front of the indentations 42. The indentations 41 and 42 function to stir gas flowing through the piping P'', such stirring of the gas being promoted by the rainfall of liquid drops 43 and the splashing of the drops in the shallow pools 42' formed in front of the bottom indentations 42.

As pointed out above, less piping is required in evaporators and absorbers of absorption refrigeration apparatus when such piping is constructed and incorporated in the apparatus in accordance with the principles of the invention. Further, this feature, as will be described presently, lends itself to refrigeration apparatus which is employed in places like boats, aeroplanes, and vehicles like trailers, for example, in which the refrigeration apparatus is not stationary.

In FIG. 6 I have illustrated a portion of a refrigeration apparatus like that shown in FIG. 1 with similar parts referred to by the same reference numerals with 100 added thereto. The embodiment of FIG. 6 employs piping 116 for the evaporator and piping 123 for the absorber. The evaporator piping 116 includes straight sections 116a and 116b which are disposed one above the other and in the same vertical plane. Likewise, the absorber piping 123 includes straight sections 123a and 123b which are disposed one above the other and in the same vertical plane.

In FIG. 6 it will be seen that the straight sections 116a, 116b of the evaporator piping and the straight sections 123a, 123b of the absorber piping are at acute angles to the horizontal which are greater than the inclination to the horizontal of the corresponding parts in FIG. 1. When the apparatus parts in FIG. 6 are upright, as illustrated in this figure, and the refrigeration apparatus during operation is stationary, the fact that the straight coil sections are at an acute angle to the horizontal which is greater than shown in FIG. 1 will enable the apparatus of FIG. 6 to operate without being adversely affected by inclinations that are encountered when it is used in a boat, aeroplane or trailer, for example. Heretofore, only small inclinations of absorpotion refrigeration apparatus could be tolerated because there was the risk that normal operation would be interrupted. When the inclination of the piping, such as the absorber piping, is too great, this will have a negative effect on the efficiency of the apparatus because the liquid will flow too fast through the absorber. In accord with my inventin this can be avoided by employing an evaporator coil having two straight sections 116a and 116b and an absorber coil having two straight sections 123a and 123b, the straight sections of each coil being/turned in opposite directions and in the same vertical plane. In this way each straight section of a coil can be embodied in the apparatus at the desired acute angle to the horizontal.

By designing each straight portion of the evaporator and absorber for approximately the capacity required for the normal function of the refrigeration apparatus, apparatus can be provided that will funtion even under very adverse conditions, such as, for example, an inclination of the apparatus in one or the other direction in the planes of the evaporator and absorber which is almost as much as the inclinations of the straight portions of the evaporator and absorber. Under these conditions the inclination of one of the straight portions of the evaporator and absorber coils will be reduced practically to nothing but the liquid will still flow through such straight portions in the proper direction. In such straight portions the normal function of the evaporator and absorber will be reduced but the other straight portion of the absorber and evaporator coils will continue to function in a normal manner.

In view of the foregoing, it will now be understood that in the embodiment of FIG. 6, the evaporator pipe sections 116a, 116b and absorber pipe sections 123a, 123b are so constructed and formed that, during normal operation of the refrigeration apparatus to produce refrigeration, each one of the pipe sections 116a or 116b and 123a or 123b alone will be capable of performing adequately for the apparatus to develop sufficient refrigerating capacity when the performance of the other one of the pipe sections 116a or 116b and 123a or 123b is impaired responsive to inclination of the apparatus from a vertical plane.

I claim:

1. In absorption refrigeration apparatus having an inert gas circuit,
   a. a heat transfer member in said circuit comprising piping inclined at an acute angle to the horizontal,
   b. means for supplying liquid to said piping,
   c. means at the inner wall of said piping defining paths of flow for the liquid, said means comprising a plurality of internal longitudinal capillary grooves which are disposed alongside one another with successive regions of said grooves in the direction of liquid flow being located at progressively different vertical distances from a horizontal plane intersecting said grooves,
   d. said grooves being at an acute angle to the generatrix of said piping which is less than the acute angle at which said piping is inclined to the horizontal, and
   e. said grooves converging to vertices of angle in the bottom generatrix of said piping, said vertices being directed in a direction opposite to the direction liquid flows through said piping.

2. In absorption refrigeration apparatus having an inert gas circuit,
   a. a heat transfer member in said circuit comprising piping inclined at an acute angle to the horizontal,
   b. means for supplying liquid to said piping,
   c. means at the inner wall of said piping defining paths of flow for the liquid, said means comprising a plurality of internal longitudinal capillary grooves which are disposed alongside one another with successive regions of said grooves in the direction of liquid flow being located at progressively different vertical distances from a horizontal plane intersecting said grooves,
   d. said grooves being at an acute angle to the generatrix of said piping which is less than the acute angle at which said piping is inclined to the horizontal, and
   e. said piping at the top part thereof being formed with at least one indentation at the underside of which liquid tends to adhere and along which liquid tends to flow, said indentation being so constructed and formed that drops of liquid are formed at its lowest part and fall therefrom.

3. In absorption refrigeration apparatus having an inert gas circuit,
   (a) a heat transfer member in said circuit comprising piping inclined at an acute angle to the horizontal,
   (b) means for supplying liquid to said piping,
   c. means at the inner wall of said piping defining paths of flow for the liquid, said means comprising a plurality of internal longitudinal capillary grooves which are disposed alongside one another with successive regions of said grooves in the direction of liquid flow being located at progressively different vertical distances from a horizontal plane intersecting said grooves,
   d. said grooves being at an acute angle to the generatrix of said piping which is less than the acute angle at which said piping is inclined to the horizontal, and
   e. said piping at the top part thereof being formed with a plurality of indentations in spaced relation and at the undersides of which liquid tends to adhere and along which liquid tends to flow, said indentations being so constructed and formed that drops of liquid are formed at their lowest parts and fall therefrom.

4. Apparatus as set forth in claim 3 in which said piping at the bottom part thereof is formed with at least one indentation which is so positioned with respect to said indentation at the top part of said piping that drops of liquid falling from the latter will collect and form a pool of liquid in front of said indentation in the bottom part of said piping.

5. Apparatus as set forth in claim 4 in which said piping at the bottom part thereof is formed with a plurality of indentations in spaced relation, each of said last-mentioned indentations being so positioned with respect to a different one of said indentations at the top part of said piping that drops of liquid falling from the latter will collect and form a pool of liquid in front of each of said indentations in the bottom part of said piping.

6. In absorption refrigeration apparatus having an inert gas circuit,
   a. a heat transfer member in said circuit comprising piping inclined to the horizontal,
   b. means for supplying liquid to said piping,
   c. means at the inner wall of said piping defining paths of flow for the liquid, said means comprising a plurality of internal longitudinally extending grooves distributed about the inner wall alongside one another,
   d. said grooves being at an angle to the generatrix of said piping, and
   e. said piping being inclined to the horizontal at an angle which is larger than the angle of said grooves with respect to the generatrix of said piping.

7. Apparatus as set forth in claim 6 in which said grooves are so constructed and formed that in the top part of said piping liquid passes from said grooves and spreads over the ridges between the grooves.

8. Apparatus as set forth in claim 7 in which all regions of individual longitudinally extending grooves, in an upright position of the apparatus, are disposed at a vertical distance from a horizontal plane above the piping, such vertical distance becoming increasingly greater in the direction of liquid flow.

9. In absorption refrigeration apparatus having an inert gas circuit,
   a. heat transfer structure in said circuit comprising at least two substantially straight pipe sections which, in an upright position of the apparatus, are inclined to the horizontal in opposite directions from a vertical plane passing through said pipe sections,
   b. said inclined pipe sections bieng disposed one above another in substantially the same vertical plane,
   c. means for supplying liquid to said pipe sections,
   d. means at the inner walls of said pipe sections defining paths of flow for the liquid, said means comprising a plurality of internal longitudinally extending grooves distributed about the inner walls alongside one another,
   e. said grooves in each pipe section being at an angle to the generatrix thereof, f. each of said pipe sections, in an upright position of the apparatus, being inclined to the horizontal at an angle which is larger than the angle of said grooves in each pipe section with respect to the generatrix thereof, and g. each one of said pipe sections, during normal operation of the apparatus, being capable of performing adequately for the apparatus to develop sufficient refrigerating capacity when the performance of the other one of said pipe sections is impaired responsive to inclination of the apparatus from the vertical plane in a direction which reduces the angle of inclination of the other one of said pipe sections to the horizontal.

10. Apparatus as set forth in claim 9 in which all regions of individual grooves in each of said pipe sections, in an upright position of the apparatus, are disposed at a vertical distance from a horizontal plane above the pipe sections, such vertical distance becoming increasingly greater in the direction of liquid flow.

* * * * *